(12) United States Patent
Pattan et al.

(10) Patent No.: US 10,237,215 B2
(45) Date of Patent: Mar. 19, 2019

(54) METHOD AND SYSTEM FOR COMMUNICATING DURING A COMMUNICATION SESSION

(71) Applicant: Samsung Electronics Co., Ltd., Gyeonggi-do (KR)

(72) Inventors: Basavaraj Jayawant Pattan, Bangalore (IN); Venkateswar Jeedigunta, Bangalore (IN); Kyung-Tak Lee, Gyeonggi-do (KR); Gyu-Bong Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 201 days.

(21) Appl. No.: 14/407,696

(22) PCT Filed: Jun. 14, 2013

(86) PCT No.: PCT/KR2013/005261
§ 371 (c)(1),
(2) Date: Dec. 12, 2014

(87) PCT Pub. No.: WO2013/187719
PCT Pub. Date: Dec. 19, 2013

(65) Prior Publication Data
US 2015/0134759 A1 May 14, 2015

(30) Foreign Application Priority Data

Jun. 15, 2012 (IN) .......................... 2393/CHE/2012

(51) Int. Cl.
*H04L 12/58* (2006.01)
*H04W 4/12* (2009.01)
(Continued)

(52) U.S. Cl.
CPC ........ *H04L 51/043* (2013.01); *H04L 12/1895* (2013.01); *H04L 65/1083* (2013.01);
(Continued)

(58) Field of Classification Search
CPC ....... H04L 51/00; H04L 51/04; H04L 51/043; H04L 51/12; H04L 65/00; H04L 65/4007; H04L 12/582; H04M 7/0024
(Continued)

(56) References Cited

U.S. PATENT DOCUMENTS

2005/0108392 A1   5/2005  Glasser et al.
2005/0148331 A1*  7/2005  Sharon .................... H04W 8/08
                                                 455/435.1
(Continued)

FOREIGN PATENT DOCUMENTS

CN       101491068    7/2009
CN       102340599    2/2012
WO    WO 2004/049686  6/2004

OTHER PUBLICATIONS

CustomGuide "Microsoft® Lync 2010 Quick Reference Card", 2011, http://customguide.com/wp-content/themes/customguide/pdf/qr/lync-quick-reference-2010.pdf.*

(Continued)

*Primary Examiner* — Joseph E Avellino
*Assistant Examiner* — Patrick F Ngankam
(74) *Attorney, Agent, or Firm* — The Farrell Law Firm, P.C.

(57) ABSTRACT

A method for notifying of an activity of a first user to a second user during a first communication session is provided. The method includes receiving an interrupt when the first user engages in a second activity during the first communication session, encoding an information message by a first device of the first user, after receiving the interrupt, and sending the information message to a second device of the second user.

13 Claims, 5 Drawing Sheets

(51) Int. Cl.
  *H04W 4/16* (2009.01)
  *H04L 12/18* (2006.01)
  *H04L 29/06* (2006.01)

(52) U.S. Cl.
  CPC ...... *H04L 65/1096* (2013.01); *H04L 65/4007* (2013.01); *H04W 4/12* (2013.01); *H04W 4/16* (2013.01); *H04L 12/189* (2013.01)

(58) Field of Classification Search
  USPC .......................................................... 709/207
  See application file for complete search history.

(56) References Cited

U.S. PATENT DOCUMENTS

| | | | | |
|---|---|---|---|---|
| 2006/0036688 | A1* | 2/2006 | McMahan | H04L 51/04 709/206 |
| 2008/0037753 | A1 | 2/2008 | Hofmann | |
| 2008/0201438 | A1 | 8/2008 | Mandre | |
| 2009/0016510 | A1* | 1/2009 | Becker | G06Q 10/107 379/142.15 |
| 2010/0075650 | A1 | 3/2010 | Tsai et al. | |
| 2011/0035443 | A1* | 2/2011 | Jensen | H04W 4/20 709/204 |

OTHER PUBLICATIONS

CustomGuide Microsoft® Lync 2010 Quick Reference Card, http://customguide.com/wp-content/themes/customguide/pdf/qr/lync-quick-reference-2010.pdf (Year: 2010).*

Chinese Office Action dated Jul. 17, 2017 issued in counterpart application No. 201380031683.0, 15 pages.

PCT/ISA/210 Search Report issued on PCT/KR2013/005261 (pp. 7).

PCT/ISA/237 Search Report issued on PCT/KR2013/005261 (pp. 6).

* cited by examiner

METHOD AND SYSTEM FOR COMMUNICATING DURING A COMMUNICATION SESSION

PRIORITY

This application is a National Phase Entry of PCT International Application No. PCT/KR2013/005261, which was filed on Jun. 14, 2013 and claims priority to Indian Patent Application No. 2393/CHE/2012 filed on Jun. 15, 2012, in the Indian Patent Office, the contents of each of which is incorporated herein by reference.

BACKGROUND OF THE INVENTION

1. Field of the Invention

The present invention relates generally to a method and system for communicating during a communication session, and more particularly, to providing a notification of a user's activity during the communication session.

2. Description of the Related Art

In an internet and mobile communication network, a plurality of messaging applications is used to communicate with a plurality of users. During a first communication session between the plurality of users, it is imperative for the communicating users to instantly know the activity of the other user, particularly when a second activity has been established between a communicating user which interrupts the first communication session.

Existing methods fail to provide information about the second activity of other users to the communicating user in a suitable time frame, e.g., instantly. If a user attempts to manually update another user about the second activity, the first communication session may get interrupted. Also, the communicating user may not be aware of the reason for interruption during the first communication session until the user receives a status update. For example, user X and user Y are communicating through an instant messenger (IM) application, and during the first communication session, user X receives a call which interrupts the IM session established with the user Y. Existing methods do not allow user X to inform user Y about the interruption. Hence, user Y is not made aware of the interruption and the pending delay from user X, which may lead user Y to believe that user X does not wish to continue with the established IM session.

Due to above mentioned reasons, existing methods fail to update the information of the user's activity even when it is imperative during the first communication session with other users.

SUMMARY OF THE INVENTION

The present invention has been made to address at least the problems and/or disadvantages described above and to provide at least the advantages described below.

In accordance with an aspect of the present invention, a method for notifying of an activity of a first user to a second user during a first communication session is provided. The method includes receiving an interrupt when the first user engages in a second activity during the first communication session, encoding an information message by a first device of the first user, after receiving the interrupt, sending the information message to a second device of the second user.

In accordance with another aspect of the present invention, a system for notifying of an activity of a first user to a second user during a first communication session is provided. The system includes a first client application installed in a first device of the first user. The first client application is configured to receive an interrupt when the first user engages in a second activity during the first communication session, to encode an information message after receiving the interrupt, and to send the information message to a second device of the second user.

In accordance with another aspect of the present invention, a non-transitory computer-readable program including instructions for executing a method for notifying of an activity of a first user to a second user during a first communication session is provided. The method includes receiving an interrupt when the first user engages in a second activity during the first communication session, encoding an information message by a first device of the first user, after receiving the interrupt, sending the information message to a second device of the second user.

BRIEF DESCRIPTION OF THE DRAWINGS

The above and other aspects, features, and advantages of certain embodiments of the present invention will be more apparent from the following detailed description when read in conjunction with the accompanying drawings, in which.

DETAILED DESCRIPTION OF EMBODIMENTS OF THE PRESENT INVENTION

Various embodiments of the present invention are described in detail below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention.

As used herein, the term "and/or" includes any and all combinations of one or more of the associated listed items.

As used herein, the terms "a" or "an" are used, as is common in patent documents, to include one or more than one, independent of any other instances or usages of "at least one" or "one or more". The terms "first" and "second" are used merely as labels, and are not intended to impose numerical requirements on their objects.

Throughout the description, the terms "update" and "notify" are used interchangeably.

Embodiments described herein provide a method and system that updates one or more communicating users during an ongoing communication session with information of a user activity when the ongoing communication session is interrupted by the activity.

In accordance with an embodiment of the present invention, the method includes sending a user's activity information message to one or more communicating users when the ongoing communication session is interrupted.

In accordance with an embodiment of the present invention, a first user using a first device installed with a first client application is engaged in communication with a second user using a second device installed with a second client application. During the ongoing communication session, the first client application is interrupted because the first user is engaged in another activity (e.g., a second activity). Further the first client application notifies the activity information of the first user to the second client application. Thus, the second user can be made aware of the first user's current activity, and the possibility of receiving a delayed response from the first user.

In accordance with an embodiment of the present invention, the ongoing communication session can be an instant messaging session or any other communication session where users are engaged in near real-time communication exchange.

In accordance with an embodiment of the present invention, the first client application and the second client application can be an Instant Messenger (IM) application, a text chat application, collaborative application or the like, which can be installed in a first device and a second device, which can both be embodied in a laptop, a Personal Digital Assistant (PDA), a personal computer, or any other device that can communicate through an internet, a mobile communication network, a cloud server, or the like.

Figure 1:
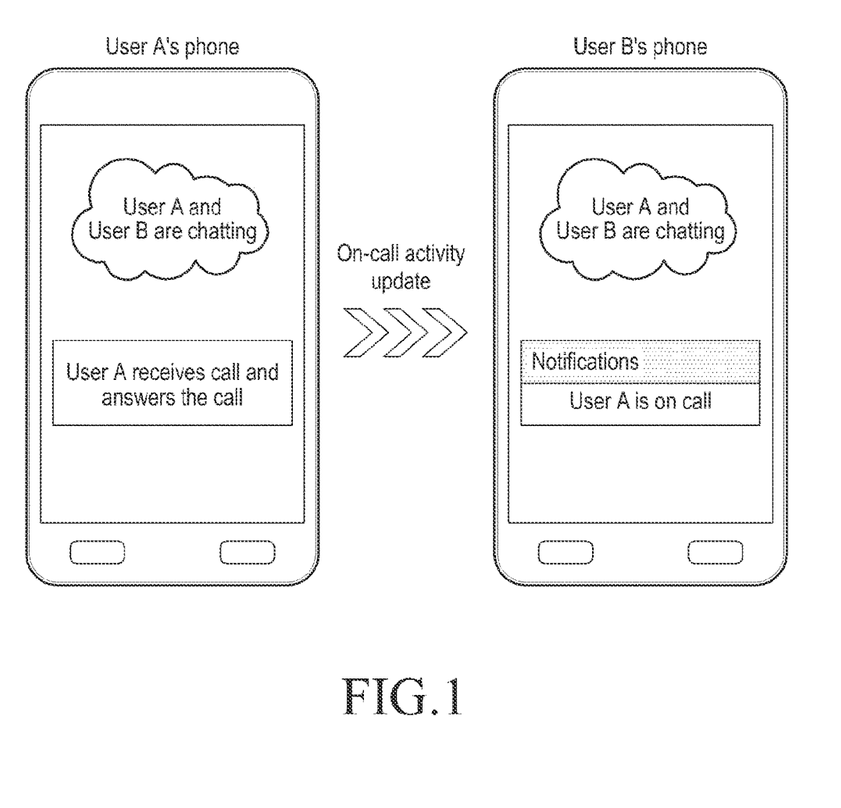
FIG. 1 is a diagram illustrating an overview in which a user's activity information message is sent, according to an embodiment of the present invention.

FIG. 1 is a diagram illustrating an overview in which the user's activity information message is sent, according to an embodiment of the present invention. As depicted in FIG. 1, a user A and a user B are shown exchanging messages (e.g., chatting) in a communication session.

When the user A is chatting with the user B, user A receives the incoming call from another user and user A answers the incoming call. When user the A answers the incoming call, user A may not be able to continue to exchange messages during the ongoing chatting session with the user B. The instant messaging application installed in the user A device may poll and/or receive registered events generated by other client applications. Further, the instant messaging application installed in the user A device generates a first user's activity information message and sends the first user's activity information message to the user B.

For example, the first user activity information message can be "User A is on call". Upon receiving the first user's activity information message, user B is made aware that the user A is on call and that user B may expect a delayed response from user A.

The first user's activity information message can be configured in the device. Additionally, the first user's activity information message can be a notification message and/or a notification message with control information.

The first user's activity information message is a special type of message originating from the device/client for informing other communicating users about the activity of the user A.

For example, the first user's activity information message is used to provide the first user's activity information of the user when the first user is interrupted by a second activity during a first ongoing communication session.

The first user's activity information message with control information controls the first communication session. The control information can pause the first communication session and resume the first communication session after the second activity is terminated.

In accordance with an embodiment of the present invention, the method described herein allows a user to configure an activity information message pertaining to each activity. The configured activity information message may be sent to other communicating users based on a second activity.

The device of the user A includes a client application which contains the activity information message with the control information to notify one or more communicating users.

For example, when the user A's activity (e.g., answering a call) interrupts the chatting session with the user B, the activity information message with the control information, as configured in the client application for that activity on the user A device, is sent to the client application on the user B device. Based on a type of the control information sent to the user B, the interrupted first communication session can be paused and resumed as needed.

In accordance with an embodiment of the present invention, the method described herein allows the activity information message and the control information to be sent as a payload or as header information to the communicating user.

In accordance with an embodiment of the present invention, when the activity information and/or the control information message is/are sent over the internet as data, the data transmitted includes both header information and the actual data being sent. The header identifies the source and destination of the data, while the actual data is referred to as the payload.

In accordance with an embodiment of the present invention, if the user A is communicating with a plurality of users (e.g., a group chat) in an ongoing communication session, the activity information message is sent to the plurality of users.

Figure 2:
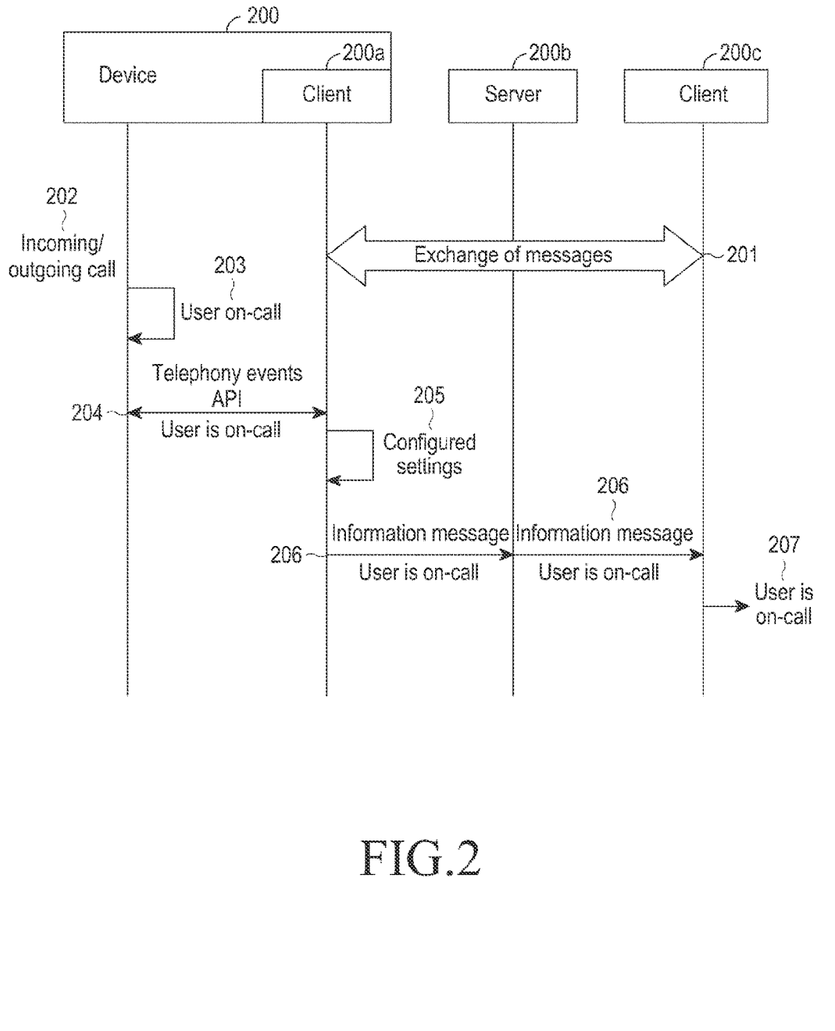
FIG. 2 is a sequence diagram illustrating a process of initiating the user's activity information message when a call is answered, according to an embodiment of the present invention.

FIG. 2 is a sequence diagram illustrating a process of initiating the user's activity information message when a call is answered, according to an embodiment of the present invention. For example, a first client application that is installed in the first device is referred to as 200a and the second client application that is installed in the second device is referred to as 200c. FIG. 2 depicts a device 200 and the client application 200a installed in the device 200 and a server 200b and the client application 200c installed in the device of other user. The server 200b may be installed or provided within the communication network to communicate with the client application 200a and the client application 200c.

Initially, users (e.g., users A and B) are engaged in a first communication session in which the client application 200a installed in the device 200 and the client application 200c exchanges (at step 201) a plurality of messages in order to establish the first communication session between the users. During the first communication session, the client application 200a installed in the device 200 receives (at step 202) an interruption, which can be an incoming call, an outgoing call or the like. Upon receiving the interruption, the client application 200a identifies (at step 203) that the user of device 200 is on call. The user of device 200 continues with the call thereby interrupting the first communication session.

The incoming call or the outgoing call can be a voice call, an internet call or the like.

For example, when the user A is chatting with the user B, user A receives the incoming call from another user and user A answers the incoming call thereby interrupting the first communication session. The user A's second activity interruption (e.g., user A on-call) is received by the client application 200a.

Upon receiving the interruption, the device 200 notifies (at step 204) the client application 200a with the registered telephony events API status. For example, the status can be call-in progress, call on-hold, call rejected or the like.

The client application 200a contains (at step 205) configuration settings to receive the user's activity and notify other users with the information message. The client application 200a encodes the activity information message using the configured message settings stored in the device 200. The client application 200a formats the activity information message using the configured message settings provided by the first user in the device 200.

The client application 200a registers with the device 200 Operating System (OS) to receive an alert message whenever the device 200 receives an event notification. The event notification can include, but is not limited to, launching an application in the device 200.

Further the client application 200a forwards (at step 206) the activity information message to the server 200b. Further the server 200b forwards (at step 206) the same activity information message to the client application 200c. Upon receiving the activity information message from the server 200b the client application 200c is made aware (at step 207) that user A is on call. For example, the activity information message can be "User A is on call". Upon receiving the activity information message, the user B is made aware that user A is on call and that user B may expect a delayed response from user A.

The activity information message can be shared with other users who intend to establish an instant communication session with the user A.

If the user B uses multiple devices during the first communication session, then the client application 200a sends the activity information message to all of the multiple devices of the user B.

If the second user B has multiple communicating devices and if one of the communicating devices of the multiple communicating devices has established a first communication session with the first user A's device, then the activity information message may be sent to all the communicating devices of the second user B due to the interruption received (on one of the devices of the second user) during the first communication session. For example, if the user B owns a Tablet and a mobile Phone which are communicating with each other and if the Tablet device of the user B is used during the first communication session with the user A, upon receiving a call from another user, the user A answers the call which interrupts the first communication session with the user B. Due to the interruption, both the devices of the user B (the Tablet device and the Phone device) receives the activity information message from the user A.

If the first user A has established a first communication session with the second user B using a first device (e.g., tablet) and the first user A receives an interrupt (for example, a call) from another user and the first user A answers the call in his third device (e.g., a mobile phone), which is a device other than the first device used by the first user that receives the interrupt during the first communication session, the activity information message is sent to the second user B or plurality of users in the first communication session notifying that the first user is on call.

The multiple devices of a user can communicate among themselves by any short range communication such as Bluetooth™, Wi-Fi, Near Field Communication (NFC) or the like.

Figure 3:
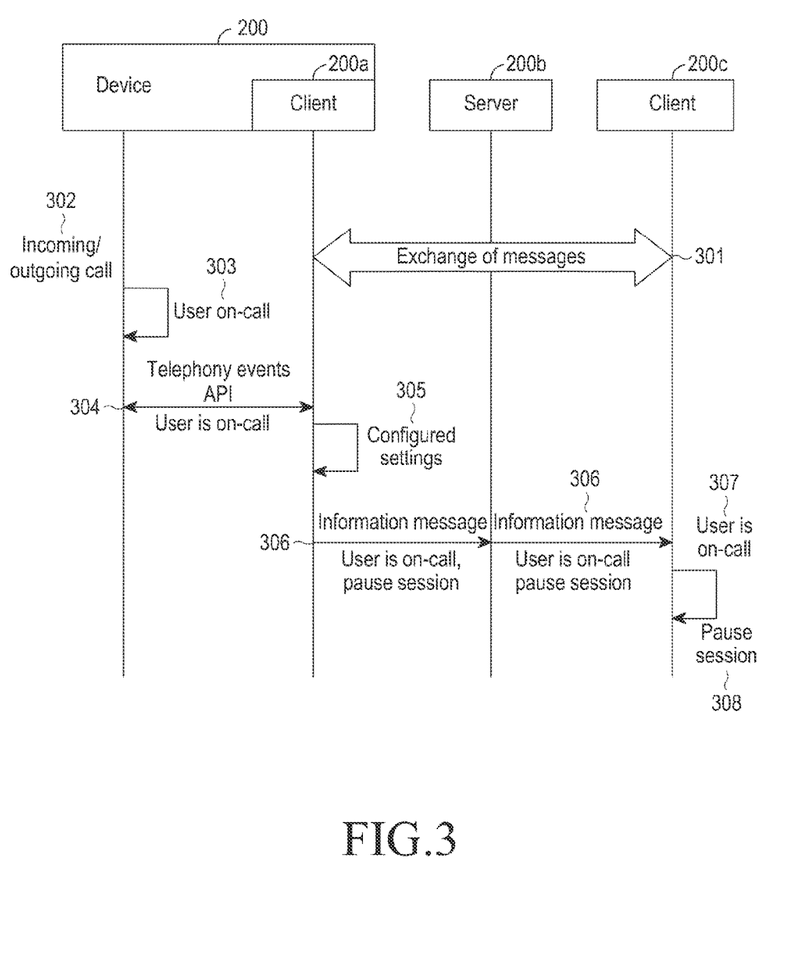
FIG. 3 is a sequence diagram illustrating a process of controlling (e.g., pausing) a progress of a first communication session, according to an embodiment of the present invention.

FIG. 3 is a sequence diagram illustrating a process of controlling (e.g., pausing) a progress of a first communication session, according to an embodiment of the present invention. FIG. 3 depicts the device 200 and the client application 200a installed in the device 200 and the server 200b and the client application 200c installed in the device of another user, as illustrated in FIG. 2. Initially, users are engaged in the first communication session in which the client application 200a installed in the device 200 and the client application 200c exchanges (at step 301) plurality of messages among themselves in order to establish the communication session between them. During the first communication session, the client application 200a installed in the device 200 receives (at step 302) an interruption.

Upon receiving the interruption, the client application 200a identifies (at step 303) that user of device 200 is on call. The user of device 200 continues with the call thereby interrupting the first communication session.

Upon receiving the interruption, the client application 200a notifies (at step 304) the client device 200 with the registered telephony events API status. For example, the status can be call-in progress, call on-hold, call rejected or the like.

The client application 200a contains (at step 305) configuration settings to receive the user's activity and notify other users with the activity information message that includes the control information.

For example, the control information can be an instruction to pause the first communication session. Further, the client application 200a forwards (at step 306) the activity information message along with the control information to the server 200b. For example, the activity information message can be "User A is on call" and the control information can be "pause session".

Further the server 200b forwards (at step 306) the same activity information message along with the control information to the client application 200c.

Upon receiving the control information from the server 200b, the client application 200c interprets (at step 307) that user A is on-call and that client application 200c needs to pause (at step 308) the first communication session established with the user A. For example, the user A is on call with another user. The user B receives the control information 'pause session' from the user A for the first communication session, then the user B pauses the first communication session instead of waiting for the response from the user A.

Although the session is paused and the user B can send text messages to the user A when the user A is engaged in the second activity, the text messages sent by the user B is stored in a temporary storage location in the device 200 or the server 200b. For example, the user A and the user B are in chat session. During this session, the user A receives another call, and user A answers the call. User B receives the control information 'pause session' from the user A for the first communication session and the client application in user B pauses the first communication session instead of waiting for the response from the user A. While the first communication session is paused, user B may continue to send the text messages to the user A. As the first communication session is paused from communicating with the user A, the text messages sent by the user B is stored in the temporary storage location in the device 200 or the server 200b.

Figure 4:
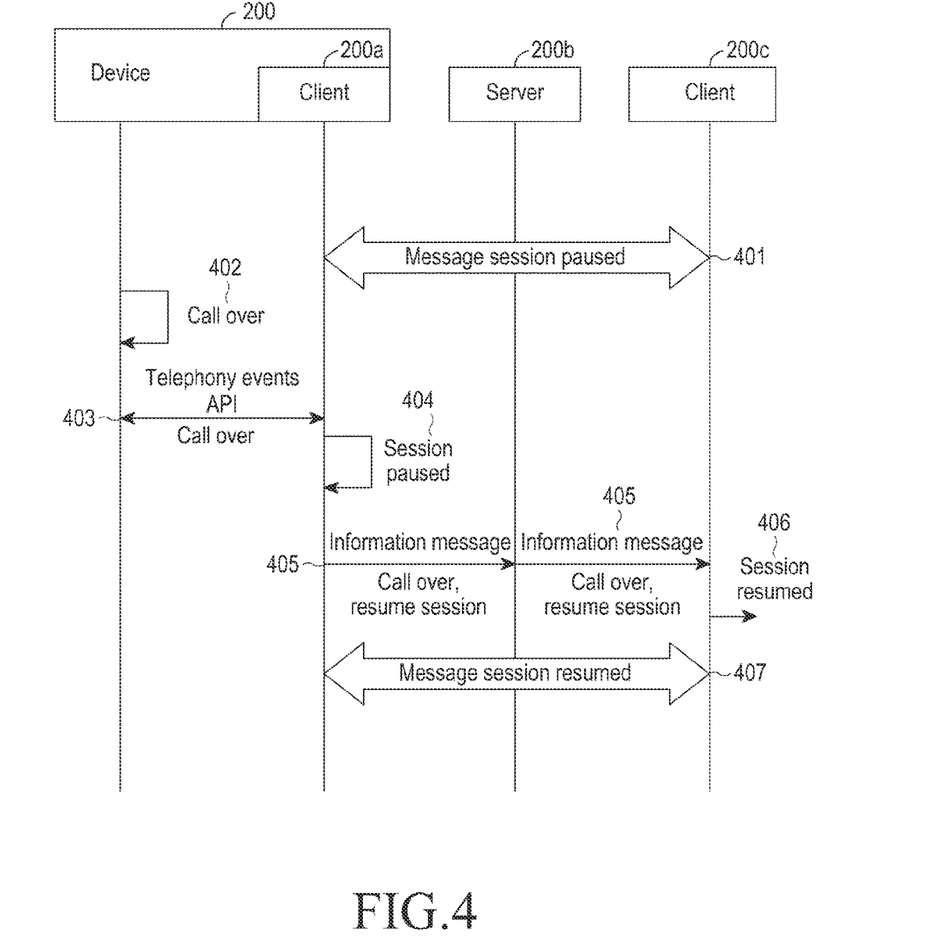
FIG. 4 is a sequence diagram illustrating a process of controlling (e.g., resuming) a progress of a first communication, according to an embodiment of the present invention.

FIG. 4 is a sequence diagram illustrating a process of controlling (e.g., resuming) a progress of a first communication, according to an embodiment of the present invention. FIG. 4 depicts the device 200 and the client application 200a installed in the device 200 and the server 200b and the client application 200c installed in the device of another user, as illustrated in FIG. 2. Initially, the message session is paused (at step 401) between the client application 200a and the client application 200c. Further the device 200 identifies (at step 402) that the user's activity is terminated. For example, as the user A answers the incoming call from another user and the client application 200a sends the 'pause session' as control information to the client application 200c to pause the first communication session; the user A has terminated the incoming call and the first communication session has to be resumed.

Further the device 200 notifies (at step 403) the client application 200a with the registered telephony events API status. For example, the status can be call terminated or the like.

The client application 200a identifies (at step 404) that the first communication session is paused. Further, the client application 200a forwards (at step 405) the activity information message with the control information to the server 200b. For example, the activity information message can be 'call terminated' and the control information can be 'resume session'. Upon receiving the activity information message along with the control information from the client application 200a, the server 200b forwards (at step 405) the same information message with the control information to the client application 200c. Further the client application 200c interprets (at step 406) that the first communication session has to be resumed. Finally, the client application 200a and the client application 200c exchange (at step 407) the information message such as 'session resume' to indicate that the paused session with the user A is resumed through the server 200b.

Communicating users send the activity information message to other communicating users. Here the user A named 'Alice' receives a call from a user named 'Scott' when Alice has established the first communication session with user B. This activity information message can be triggered automatically by the client application based on user settings when the client is notified that a user is engaged in another activity, through the telephony API. Another way of automatically triggering the activity message is by using the server based on user preferences when the messaging service receives notifications about a user that is engaged in another activity from another service.

"Display-message" indicates the message to be displayed to the user. This message can be a preferred message as indicated in settings from the list of pre-configured messages by the user. If there is no user preference, the default message is used.

Contact-name: If the display message requires the contact info then this element will indicate the name of the contact to be included.

Contact-number: If the display message includes contact-info-name element then this element indicates the number corresponding to the name element.

In this case, the client application in user A device sends the activity information message 'Alice is on call' with <Scott> to the user B, Sorry I received a call right now, please wait and so on.

Examples of XML-encoded activity-system-message data format may be as follows:

```
<?xml version="1.0" encoding="UTF-8"?>
<activity-system-message>
<message-type>MessageAndControl</message-type>
<activity-type type="user-on-call">
<display-message>Alice is on call</display-message>
<contact-name>Scott</contact-name>
<contact-number>+1800 4181 9999</contact-number>
</activity-type>
<control>
<control-message>pause</control-message>
<control-type>strict</control-type>
</control>
<defer-messages>
<defer-at>client</defer-at>
</defer-messages>
</activity-system-message>
```

Communicating users can send the activity information message to other communicating users using a Session Initiation Protocol (SIP) MESSAGE method or a Message Session Relay Protocol (MSRP) SEND method.

A script implementing the SIP MESSAGE method in the client application of user A to send the user's activity information message to the user B can include, for example, the user A named 'Alice' receiving a call from another user named 'Scott' while the users A and B are communicating in an first communication session. The first client application in user A sends the activity information message along with the control information to the second client application in user B, such a script may be configured as follows:

```
MESSAGE sip:user2@domain.com SIP/2.0
Via:SIP/2.0/TCP user1pc.domain.com;branch=z9hG4bK776sgdkse
Max-Forwards: 70
From: sip:user1@domain.com;tag=49583
To: sip:user2@domain.com
Call-ID: asd88asd77a@1.2.3.4
CSeq: 1 MESSAGE
Content-Type: application/activity+xml
Content-Length: xyz
<?xml version="1.0" encoding="UTF-8"?>
<activity-system-message>
<message-type>MessageAndControl</message-type>
<activity-type type="user-on-call">
<display-message>Alice is on call</display-message>
    <contact-name>Scott</contact-name>
    <contact-number>+1800 4181 9999</contact-number>
</activity-type>
<control>
    <control-message>pause</control-message>
    <control-type>strict</control-type>
</control>
<defer-messages>
    <defer-at>client</defer-at>
</defer-messages>
</activity-system-message>
```

In the above script, a control message element is used to share the activity information message with the control information to control the first communication session. A defer message element is used to defer the text message(s) that is sent by the paused device during the second activity.

A script implementing the MSRP SEND method in the first client application of user A to send the user's activity information message to the second client application of user B may be as follows:

```
MSRP a786hjs2 SEND
    To-Path: msrp://biloxi.example.com:12763/kjhd37s2s20w2a;tcp
    From-Path: msrp://atlanta.example.com:7654/jshA7weztas;tcp
    Message-ID: 87652491
```

-continued

```
Byte-Range: 1-25/25
Content-Type: application/activity+xml
<?xml version="1.0" encoding="UTF-8"?>
<activity-system-message>
<message-type>MessageAndControl</message-type>
<activity-type type="user-on-call">
    <display-message>Alice is on call</display-message>
    <contact-name>Scott</contact-name>
    <contact-number>+1800 4181 9999</contact-number>
</activity-type>
<control>
    <control-message>pause</control-message>
    <control-type>strict</control-type>
</control>
<defer-messages>
    <defer-at>client</defer-at>
</defer-messages>
</activity-system-message>
```

User-Browsing-Device Activity Type

This message type can be triggered by the first client application automatically based on user settings when the first client application detects that first user (e.g., user A) is browsing files or folders on the first device.

"Display-message" indicates a message that is to be displayed to the second user (e.g., user B). This message can be a preferred message as indicated in settings from the list of pre-configured message by the first user. If there is no user preference, the default message is used.

Browsing-type: If the display message requires further information of what content is being browsed, then this element will indicate such information. The information relating to the content being browsed can include contacts, images, videos, documents, calendar and so on.

The object-info element can include additional information of the object being browsed. For example: album name in the case of images or videos being browsed.

The message displayed can be, for example, user A (Alice) is searching contacts, Alice is searching photos, Alice is searching photo album <Paris>, Alice is searching videos and so on.

Examples of XML-encoded activity-system-message data format may be as follows:

```
<?xml version="1.0" encoding="UTF-8"?>
<activity-system-message>
<message-type>MessageOnly</message-type>
<activity-type type="user-browsing-device">
    <display-message>Alice is searching</display-message>
    <browsing-type>photos</browsing-type>
    <object-info>Paris</object-info>
</activity-type>
<defer-messages>
    <defer-at>client</defer-at>
</defer-messages>
</activity-system-message>
```

User-Browsing-Internet Activity Type

This message type can be triggered by the first client application automatically based on first user (user A) settings when the first client application in first device detects that user A is browsing internet on the device.

"Display-message" indicates a message that is to be displayed to the second user (user B). This message can be a preferred message as indicated in settings from the list of pre-configured message by the first user. If there is no user preference, the default message is used.

Browsing-URL: If the display message requires further information of what content is being browsed, then this element will indicate such information. The information can be the actual link being browsed.

The message displayed can be, for example (user A) Alice is browsing internet, Alice is browsing internet (<www.xyz.com/mobiles>).

Examples of XML-encoded activity-system-message data format may be as follows:

```
<?xml version="1.0" encoding="UTF-8"?>
<activity-system-message>
<message-type>MessageAndControl</message-type>
<activity-type type="user-browsing-internet">
    <display-message>Alice is browsing internet</display-message>
    <browsing-URL>www.xyz.com/mobiles</browsing-url>
</activity-type>
<control>
    <control-message>pause</control-message>
    <control-type>not-strict</control-type>
</control>
</activity-system-message>
```

User-Switched-Application Activity Type:

This message type can be triggered by the first client application automatically based on first user (user A) settings when the first client application detects that user A launched another application on the first device.

"Display-message" indicates a message that is to be displayed to the second user (user B). This message can be a preferred message as indicated in settings from the list of pre-configured message by the first user. If there is no user preference, the default message is used.

Application-name: If the display message requires further information of what application is launched, then this element will indicate such information. The information can be the name of the application launched.

The message displayed can be, for example, user A (Alice) launched application, Alice launched <Social Hub> application.

Examples of XML-encoded activity-system-message data format may be as follows:

```
<?xml version="1.0" encoding="UTF-8"?>
<activity-system-message>
<message-type>MessageAndControl</message-type>
<activity-type type="user-switched-application">
    <display-message>Alice launched application</display-message>
    <application-name>Social Hub</application-name>
</activity-type>
<control>
    <control-message>pause</control-message>
    <control-type>strict</control-type>
</control>
</activity-system-message>
```

For the User-Switched-Window Activity Type

This message type can be triggered by the first client application automatically based on user settings when the first client application detects that first user (user A) has switched to another window on the first device.

"Display-message" indicates a message that is to be displayed to the second user (user B). This message can be a preferred message as indicated in settings from the list of pre-configured message by the first user. If there is no user preference, the default message is used.

Window-name: If the display message requires further information of what window is active, then this element will indicate such information. The information can be the user name on the window.

The message displayed can be, for example, user A (Alice) switched to another chat window, Alice switched to <soccer> chat window.

Examples of XML-encoded activity-system-message data format may be as follows:

```
<?xml version="1.0" encoding="UTF-8"?>
<activity-system-message>
    <message-type>MessageOnly</message-type>
    <activity-type type="user-switched-window">
        <display-message>Alice switched to another chat window
</display-message>
        <window-name>Soccer</window-name>
    </activity-type>
    <defer-messages>
        <defer-at>client</defer-at>
    </defer-messages>
</activity-system-message>
```

For the Away-from-Device Activity Type:

This message type can be triggered by the first client application automatically based on user settings when the client application detects, for example, using the front camera on the device, that user A is away from the device.

"Display-message" indicates a message that is to be displayed to the user B. This message can be a preferred message as indicated in settings from the list of pre-configured message by the user A. If there is no user preference, the default message is used.

Away-since: If the display message requires a time duration that the user A is away from the device, then this element will indicate the time duration in minutes.

The message displayed can be, for example, Alice is away, Alice is away since <2 minutes> and so on.

Examples of XML-encoded activity-system-message data format may be as follows:

```
<?xml version="1.0" encoding="UTF-8"?>
<activity-system-message>
    <message-type>MessageOnly</message-type>
    <activity-type type="away-from-device">
    <display-message>Alice is away</display-message>
    <away-since>2 minutes</away-since>
    </activity-type>
        </activity-system-message>
```

For the User-on-Camera Activity Type:

This message type can be triggered by the first client application automatically based on user settings when the first client application detects that the user A is using camera on the device.

"Display-message" indicates a message that is to be displayed to the user B. This message can be a preferred message as indicated in settings from the list of pre-configured message by the user A. If there is no user preference, the default message is used.

Camera-usage: If the display message indicates camera usage, then this element will indicate why the camera is being used currently e.g., taking photo, taking video.

The object-type element can contain additional information of the identified object as focused by the camera.

The message displayed can be, for example, Alice is taking photo, Alice is taking video, Alice is taking <flower> photo and so on.

Examples of XML-encoded activity-system-message data format may be as follows:

```
<?xml version="1.0" encoding="UTF-8"?>
<activity-system-message>
<message-type>MessageAndControl</message-type>
<activity-type type="user-on-camera">
    <display-message>Alice is taking photo</display-message>
    <camera-usage>photo</camera-usage>
    <object-type>flower</object-type>
</activity-type>
<control>
    <control-message>pause</control-message>
    <control-type>not-strict</control-type>
</control>
<defer-messages>
    <defer-at>server</defer-at>
</defer-messages>
</activity-system-message>
```

In accordance with an embodiment of the present invention, a plurality of devices can subscribe for receiving the user's activity information message from other devices by using a SIP SUBSCRIBE method.

In accordance with an embodiment of the present invention, a plurality of devices can notify the configured activity information messages to the communicating users by using a SIP NOTIFY method. The notified list of messages can be subscribed by the plurality of devices using the SIP SUBSCRIBE method.

In accordance with an embodiment of the present invention, a user can refer, notify, and subscribe the activity information message using the SIP REFER, SIP NOTIFY and SIP SUBSCRIBE methods respectively.

Proactive Subscription

For example, the user A can proactively subscribe to receive the user's activity information message from the client application of user B using the SIP SUBSCRIBE method. User B on receiving the subscription request from the user A can either accept or reject the subscription request. If the user B rejects the subscription request, then the user A is notified about the rejection. If the user B accepts the subscription request, then the user A starts receiving the information message through the SIP NOTIFY method.

A script implementing the SIP SUBSCRIBE method in the first client application of the user A to subscribe for the information message of the second client application of user B may be as follows:

SUBSCRIBE sip:bob@example.com SIP/2.0
To: sip:bob@example.com
From: sip:alice@wonderland.com
Contact: sip:user@userpc.wonderland.com
Event: activity-system-message
Call-ID: knsd08alas9dy@3.4.5.6
CSeq: 1 SUBSCRIBE
Expires: 3600
Content-Length: 0

A script implementing the SIP NOTIFY method in the first client application of user A to notify the user B with a list of configured information message may be as follows:

```
NOTIFY sip:user@userpc.wonderland.com
To: sip:alice@wonderland.com
From: sip:bob@example.com
Call-ID: knsd08alas9dy@3.4.5.6
CSeq: 1 NOTIFY
Content-Type: application/activity+xml
<?xml version="1.0"?>
<activity-system-message>
<message-type>MessageAndControl</message-type>
<activity-type type="user-on-call">
```

```
        <display-message>Alice is on call</display-message>
        <contact-name>Scott</contact-name>
        <contact-number>+1800 4181 9999</contact-number>
    </activity-type>
    <control>
        <control-message>pause</control-message>
        <control-type>strict</control-type>
    </control>
    <defer-messages>
        <defer-at>client</defer-at>
    </defer-messages>
</activity-system-message>
```

Reactive Subscription

For example, user B can send a list of configured notification messages to the user A using the SIP REFER method. Upon receiving the list from the user B, user A subscribes to the list of activity information messages using the SIP SUBSCRIBE method. User A receives the subscribed activity information message from the user B through the SIP NOTIFY method.

A script implementing the SIP REFER method in the second client application of the user B to refer to a list of configured activity information messages in the second client application of user B that can be subscribed by the user A may be as follows:

REFER sip:alice@wonderland.com SIP/2.0
    To: sip:alice@wonderland.com
    From: sip:bob@example.com;tag=193402342
    Call-ID: knsd08alas9dy@3.4.5.6
    CSeq: 93809823 REFER
    Refer-To:sip:bob@example.com;method=SUBSCRIBE;
Event=activity-system-message
    Contact: sip:user@userpc.example.com
    Content-Length: 0

A script implementing the SIP SUBSCRIBE method in the first client application of user A and to subscribe to the information message from user B may be as follows:

SUBSCRIBE sip:user@userpc.example.com SIP/2.0
    To: sip:bob@example.com
    From: sip:alice@wonderland.com
    Contact: sip:user@userpc.wonderland.com
    Event: activity-system-message
    Call-ID: knsd08alas9dy@3.4.5.6
    CSeq: 1 SUBSCRIBE
    Expires: 3600
    Content-Length: 0

An example script implementing the SIP NOTIFY method in the second client application of user B to notify the user A with the configured information message may be as follows:

```
    NOTIFY sip:user@userpc.wonderland.com
    To: sip:alice@wonderland.com
    From: sip:bob@example.com
    Call-ID: knsd08alas9dy@3.4.5.6
    CSeq: 1 NOTIFY
    Content-Type: application/activity+xml
    <?xml version="1.0"?>
    <activity-system-message>
    <message-type>MessageAndControl</message-type>
    <activity-type type="user-on-call">
        <display-message>Alice is on call</display-message>
        <contact-name>Scott</contact-name>
        <contact-number>+1800 4181 9999</contact-number>
    </activity-type>
    <control>
        <control-message>pause</control-message>
        <control-type>strict</control-type>
    </control>
    <defer-messages>
        <defer-at>client</defer-at>
    </defer-messages>
</activity-system-message>
```

In accordance with an embodiment of the present invention, the method described herein allows a user to communicate the activity information message (on multiple communication channels) to a plurality of devices, using a Universal Plug and Play (UPnP, Digital Living Network Alliance (DLNA), Bluetooth or the like.

In accordance with an embodiment of the present invention, the control information can be a "hold session". For example, when the user A is on call with another user and if the user B receives the control information 'hold session' from the user A for the first communication session, then the client application in user B device holds the first communication session instead of waiting for the response from the user A.

Figure 5:
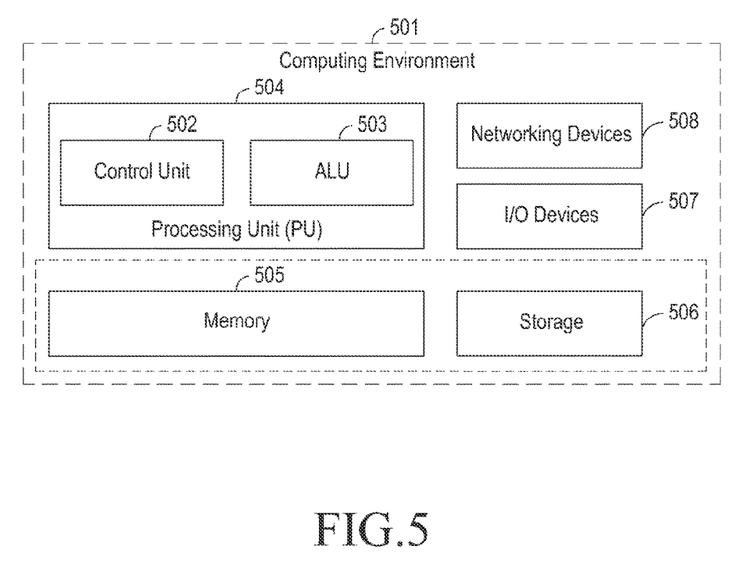
FIG. 5 is a diagram illustrating components of a system for implementing a method for providing a notification of a user's activity during a communication session.

FIG. 5 is a diagram illustrating components of a system for implementing a method for providing a notification of a user's activity during a communication session. As depicted in FIG. 5. the components of a computing environment 501 includes at least one processing unit 504 that is equipped with a control unit 502 and an Arithmetic Logic Unit (ALU) 503, a memory 505, a storage unit 506, plurality of networking devices 508 and a plurality Input output (I/O) devices 507. The processing unit 504 is responsible for processing instructions of an algorithm. The processing unit 504 receives commands from the control unit 502 in order to perform its processing. Further, any logical and arithmetic operations involved in the execution of the instructions are computed with the help of the ALU 503.

The overall computing environment 501 can be composed of multiple homogeneous and/or heterogeneous cores, multiple CPUs of different kinds, special media and other accelerators. The processing unit 504 is responsible for processing the instructions of the algorithm. Further, the processing unit 504 may be located on a single chip or over multiple chips.

An algorithm including instructions and codes required for the implementation of the methods described herein are stored in either the memory unit 505 or the storage 506 or both. At the time of execution, the instructions may be fetched from the corresponding memory 505 and/or storage 506, and executed by the processing unit 504.

In the instance where hardware implementations need to be performed, various networking devices 508 or external I/O devices 507 may be connected to the computing environment 501 to support the hardware implementations through the networking unit and the I/O device unit.

The embodiments disclosed herein can be implemented through at least one software program running on at least one hardware device and performing network management functions to control the elements. The elements shown in FIGS. 1-5 include blocks which can be at least one of a hardware device, or a combination of hardware device and software module.

While one or more embodiments of the present invention have been described with reference to the figures, it will be understood by those of ordinary skill in the art that various changes in form and details may be made therein without departing from the spirit and scope of the present invention as defined by the following claims and their equivalents.

The invention claimed is:

1. A method for notifying a second device of an activity of a first device during an ongoing first communication session between the first device and the second device, the method comprising:
   establishing, by the first device, the first communication session with the second device;
   detecting an occurrence of the activity which the first device is engaged in, by the first device, during the ongoing first communication session;
   encoding an information message, which includes information on the occurrence of the activity and control information to pause or resume the first communication session, by the first device; and
   sending the information message to the second device,
   wherein the information on the occurrence of the activity comprises at least one of:
      information on a third device, which is on a call with the first device,
      uniform resource locator (URL) information on an internet site browsed by the first device,
      information on a window switched by the first device; and
      information on camera usage of the first device;
   wherein encoding the information message comprises encoding the information message based on a first client application in the first device,
   wherein sending the information message comprises sending the information message to a second client application in the second device, and
   wherein the information message includes the activity of the first device.

2. The method of claim 1, further comprising formatting the information message using preconfigured message settings.

3. The method of claim 1, further comprising configuring the information message in the first client application.

4. The method of claim 1, further comprising subscribing to receive the information message by the second device during the ongoing first communication session.

5. The method of claim 1, wherein sending the information message further comprises sending the information message to a plurality of client applications in a plurality of devices different from the second device.

6. The method of claim 1, wherein sending the information message further comprises sending the information message to a plurality of devices different from the second device in the ongoing first communication session.

7. The method of claim 6, wherein sending the information message to the plurality of devices further comprises automatically sending the information message to the second client application in the second device.

8. The method of claim 1, wherein the first device detects the occurrence of the activity during the ongoing first communication session from a fourth device.

9. A first device for notifying a second device of an activity of the first device during an ongoing first communication session between the first device and the second device, the first device comprising:
   a processor; and
   a memory that stores a first client application therein, which when executed, instructs the processor to:
      establish the first communication session with the second device,
      detect an occurrence of the activity which the first device is engaged in, during the ongoing first communication session,
      encode an information message, which includes information on the occurrence of the activity and control information to pause or resume the first communication session, and
      send the information message to the second device,
   wherein the information on the occurrence of the activity comprises at least one of:
      information on a third device, which is on a call with the first device,
      uniform resource locator (URL) information on an internet site browsed by the first device,
      information on a window switched by the first device, and
      information of on camera usage of the first device,
   wherein encoding the information message comprises encoding the information message based on the first client application in the first device,
   wherein sending the information message comprises sending the information message to a second client application in the second device, and
   wherein the information message includes the activity of the first device.

10. A computer-program product comprising a non-transitory computer-readable program including instructions for notifying a second device of an activity of a first device during an ongoing first communication session between the first device and the second device, the computer-program product, when executed by a processor, instructs the processor to:
   establish the first communication session with the second device;
   detect an occurrence of the activity which the first device is engaged in, during the ongoing first communication session;
   encode an information message, which includes information on the occurrence of the activity and control information to pause or resume the first communication session, by the first device; and
   send the information message to the second device,
   wherein the information on the occurrence of the activity comprises at least one of:
      information on a third device, which is on a call with the first device,
      uniform resource locator (URL) information on an internet site browsed by the first device,
      information on a window switched by the first device, and
      information on camera usage of the first device;
   wherein encoding the information message comprises encoding the information message based on a first client application in the first device,
   wherein sending the information message comprises sending the information message to a second client application in the second device, and
   wherein the information message includes the activity of the first device.

11. The computer-program product of claim 10, wherein the second device, which has established the first communication session with the first device, communicates with a fourth device.

12. The method of claim 1, wherein the second device, which has established the first communication session with the first device, communicates with a fourth device.

13. The first device of claim 9, wherein the second device, which has established the first communication session with the first device, communicates with a fourth device.

\* \* \* \* \*